United States Patent                                                               [11] 3,632,318

[72] Inventors  John E. Paustian
                Whippany;
                Waldo De Thomas, Parsippany, both of
                N.J.
[21] Appl. No.  470,215
[22] Filed      July 7, 1965
[45] Patented   Jan. 4, 1972
[73] Assignee   Thiokol Chemical Corporation
                Bristol, Pa.

[54] PROCESS FOR PREPARING HYDRAZINIUM
     DIPERCHLORATE
     3 Claims, No Drawings
[52] U.S. Cl. .................................................. 23/356,
                                          23/85, 23/190, 149/36
[51] Int. Cl. ............................................... C01b 21/52,
                                                       C01b 7/00
[50] Field of Search ........................................... 23/85,
                                                190, 356; 149/36

[56]                References Cited
              UNITED STATES PATENTS
3,131,997   5/1964   Stein ........................... 149/36 X Primary Examiner—Leland A. Sebastian
Attorney—Thomas W. Brennan CLAIM: 1. A process for concurrently decreasing the perchloric acid and water content of hydrazinium diperchlorate dihydrate contaminated with perchloric acid and water, comprising the steps of at least once:

a. contacting the hydrazinium diperchlorate dihydrate with at least about an equal weight of concentrated hydrogen fluoride below about 19° C. until a slurry of solid anhydrous hydrazinium diperchlorate, hydrogen fluoride, perchloric acid and water is formed; and b. separating the solid anhydrous hydrazinium diperchlorate present in the slurry.

PROCESS FOR PREPARING HYDRAZINIUM DIPERCHLORATE

This invention relates to an improved process for preparing anhydrous hydrazinium diperchlorate substantially free of contaminants.

More particularly this invention concerns a nonthermal process for concurrently decreasing the water and perchloric acid content of hydrazinium diperchlorate.

Hydrazinium diperchlorate in its anhydrous form in an exceedingly energetic oxidizer. In addition to its potency, it has certain other advantages which would make it desireable as an oxidizer in solid propellant compositions. These advantages include high density, a high-burning rate and relatively low sensitivity toward detonation from shock.

During the preparation of hydrazinium diperchlorate in its anhydrous form, close control of contaminants such as water and perchloric acid is essential. This is particularly true when hydrazinium diperchlorate is prepared by the so-called "wet" or neutralization type of processes. In these processes an aqueous solution or suspension of hydrazine or its salts such as the mono and dihydrochloride are treated with a large excess of concentrated (72 percent by weight or higher) perchloric acid to form the diperchlorate. After the diperchlorate is formed it is separated from the chilled perchloric acid mother liquor by the usual separation means such as filtration or centrifugation. Hydrazinium diperchlorate crystals in the form of what is referred to as a "cake" ordinarily contains as much as 15 percent by weight of perchloric acid and water. To obtain anhydrous hydrazinium diperchlorate in a form suitable for propellant application, the water and perchloric acid must be substantially removed from the reaction cake. Because of high (and incongruent) solubility of hydrazinium diperchlorate in water, the residual perchloric acid cannot effectively be removed by washing with water. For this reason and because of the thermal instability of hydrazinium diperchlorate removal of the perchloric acid mother liquor is accomplished by the use of relatively low temperature (less than 75° C.) coupled with exceedingly high vacuums. Even so the presence of residual perchloric acid at these temperatures has occasioned dangerous and costly decompositions.

Because of the problems encountered in removing the residual percholoric acid prior to the drying stage, a nonthermal method of removing residual perchloric acid form the hydrazinium diperchlorate cake is desirable. Ideally this step would precede the drying of the cake, would not require special vacuum and drying equipment, would not require a lengthy process cycle and would utilize readily available materials. Further an improved process could be safely performed by relatively unskilled personnel and would result in a hydrazinium diperchlorate product stable to drying and low in residual perchloric acid. An additional advantage would be that the pretreatment method would be applicable to hydrazinium deperchlorate obtained form any neutralization process regardless of the perchloric acid or water content of the mother liquor.

A process of the type described above would represent a major advance in of preparing hydrazinium diperchlorate art.

Thus it is an object of this invention among others to prepare hydrazinium diperchlorate derived from a variety of mother liquors substantially free from residual perchloric acid and water.

A further object of this invention is to develop an improved method of reducing the perchloric acid content of hydrazinium diperchlorate filter cake without utilizing vacuum or thermal drying procedures.

Still another object of this invention is to prepare an improved hydrazinium diperchlorate prior to drying, which can be safely dried to its anhydrous form without decomposition.

A further objects of this invention is the development of the previously described predrying method which can be incorporated into any hydrazinium diperchlorate neutralization process to prepare a superior predrying reaction product.

Additional objects will become apparent to those skilled in the art after further perusal of this application.

The above object among others are accomplished by treating the wet solid filter cake containing hydrazinium diperchlorate with concentrated hydrogen fluoride. The wet solid filter cake which is the starting material of this process is derived from neutralizing hydrazine base or its salts with perchloric acid. The cake results from the filtration, centrifugation or the like of the reactive mixture to concentrate and isolate the hydrazinium diperchlorate product.

In the preferred practice, the hydrazinium diperchlorate filter cake derived as described above is contacted with anhydrous hydrogen fluoride to form a slurry. The filter cake is slurred at low temperatures until the perchloric acid is leached into the mother liquor. The hydrazinium diperchlorate in the slurry is separated, preferably by centrifugation, but it can be separated by filtration or the like. The separated hydrazinium diperchlorate largely free from perchloric acid is then dried under vacuum at room temperature to give the finished product.

To more readily reveal the workings of this invention is the greatest possible detail, the following illustrative embodiments are submitted.

In one embodiment, a mixture of 3.4327 g. of hydrazinium diperchlorate filler cake (Analysis: 80.81 percent by weight by hydrazinium diperchlorate, 5.00 percent perchloric acid, and, by difference, 14.2 percent by weight $H_2O$), and 4.794 g. of anhydrous hydrogen fluoride is stirred for 1 hour at 0° Co, and then filtered, This procedure is repeated two more times with additional quantities of hydrogen fluoride (5.170 g./wash). After the third treatment the mixture is filtered, and then dried in vacuo for 30 minutes at room temperature. Analysis of the dried solid (1.868 g.) indicates the composition to be 97.28 percent hydrazinium diperchlorate, 0.62 percent perchloric acid, and, by difference, 2.10 percent $H_2O$. This treatment results in the removing of 88 percent of the perchloric acid and 85 percent of the $H_2O$ in the original cake.

In a comparable embodiment using the same materials and quantities of reagents the process is repeated except that the slurry washing is conducted at $-10°$ C.

In another embodiment, a mixture of 3.1639 g. of hydrazinium diperchlorate, filter cake (Analysis: 88.78 percent by weight hydrazinium diperchlorate, 7.56 percent by weight perchloric acid, and by difference, 3.66 percent by weight $H_2O$) and 4.680 g. of anhydrous HF is slurried for about 1 hour at 0° C. then filtered. The slurring procedure is repeated two more times using additional quantities of anhydrous HF (4.70 g. and 4.888 g. respectively per wash). After the third treatment the mixture is centrifuged, filtered, then dried in vacuo for 38 minutes at room temperature. Analysis of the dried, treated product (2.3822 g.) indicates the composition to be 100 percent hydrazinium diperchlorate. The treatment results in this instance in the complete (100 percent) removal of the perchloric acid and $H_2O$.

In an analogous embodiment the above procedure is repeated using the same quantities of materials except that each of the slurring steps of the filter cake with HF takes place for 20 minutes at 0° C. Analysis of the hydrazinium diperchlorate solid cake indicates identical results are obtained.

In a further embodiment 3.5 g. of hydrazinium diperchlorate filter cake used in the second embodiment is slurried for 10 minutes each of the three times, with 35 parts by weight of anhydrous HF, filtered each time and the HF wash discarded. At the end of this time the solid hydrazinium diperchlorate cake is dried under vacuum at room temperature for 2 hours. Analysis of the hydrazinium diperchlorate cake confirms that it is 100 percent hydrazinium diperchlorate.

The above embodiment is repeated except that the slurrying operations in each instance are conducted at 10° C. The rest of the procedure is identical to the embodiment described above. Analysis of the cake confirms the cake to be about 100 percent hydrazinium diperchlorate.

In another embodiment the above run is repeated using the same ratio of materials, the same temperatures as well as identical slurrying times. However, in this run the slurrying step is repeated eight times using one-half the quantity of HF used above, each time. After drying analysis of the hydrazinium diperchlorate cake indicates complete removal of the perchloric acid.

In a yet further embodiment the proceeding embodiment is repeated using the same quantities of materials and the same periods of time as supra. However in this instance each of the slurrying steps is performed at 18° C. The same filtration and isolation procedures are used. Again analysis indicates the cake to be about 100 percent hydrazinium diperchlorate.

In still a further embodiment, a mixture of 2.564 g. of hydrazinium diperchlorate filter cake (Analysis 86.94 percent by weight of hydrazinium diperchlorate, 10.05 percent by weight of perchloric acid, and, by difference 3.01 percent by weight of water) and 3.804 g. of hydrogen fluoride was stirred for 1 hour at 0° C., then filtered, and the solid phase dried under vacuum for 20 minutes at room temperature. Analysis of the dried solid (2.169 g.) indicates the composition to be 95.24 percent by weight of hydrazinium diperchlorate, 3.13 percent by weight of perchloric acid and, by difference 1.63 percent by weight of water. This amount to a 74 percent removal of residual perchloric acid.

As the previous embodiments indicate, numerous modifications and changes can be made in the inventive process without substantially altering the inventive concept.

For instance a 1.5:1 or greater weight ratio of anhydrous hydrogen fluoride to hydrazinium diperchlorate is preferred, a 1:1 ratio is acceptable. However, at lower ratios of about 1:1 or less, substantially complete removal of perchloric acid is retarded unless longer contacts and/or more replicate treatments are utilized. Ratios of more than 1.5:1 (HF: hydrazinium diperchlorate) are preferred because they yield a product substantially free from perchloric acid without the need for extended contact times and more frequent slurrying operations.

The slurrying time is also a variable and can range in extreme cases from 10 minutes to several hours or more. However, to assure substantial removal of perchloric acid and water when short slurrying times are used, it is recommended that weight ratios of 4:1 (HF:hydrazinium diperchlorate) or greater be used, with or without repetitive slurrying treatments. However nothing indicates that greatly extended slurrying times are harmful.

As indicated by the illustrative embodiments the slurring operation can be conducted between about −10° to 18° C. The upper temperature is limited by the 19° C. boiling point of anhydrous HF.

While satisfactory results can be obtained by repeating the slurrying operation twice, it is preferred to repeat the slurrying step three or more times. The upper limit or repeating the slurrying step is primarily one of economy and convenience. Again if greater ratios of HF to hydrazinium diperchlorate are used more latitude is possible in reducing the number of repetitive slurrying operation.

The drying of the treated hydrazinium diperchlorate filter cake is performed under vacuum (5 mm. or higher) until removal of perchloric acid and water is substantially effected. This time cannot be stated with precision since it varies according to batch size, the drying temperature, the amount of vacuum and the efficiency of the preceding filtration and centrifugation step. However, under so-called "average" general conditions and at about 20° to 30° C. the drying time ranges between about 15 minutes to 4 hours with longer times not being considered harmful.

The inventive process is advantageous in several respects including, more complete removal of perchloric acid and water, the obviating of the need for special vacuum drying equipment, decreased safety hazards, and a much shortened drying cycle to obtain a more highly purified product. In this latter respect, a great reduction in drying time is observed even when the prior art procedure is followed. For instance at 1 torr and 75° C. at least 16 hours of drying time is required to produce a hydrazinium diperchlorate product low in perchloric acid and water. Even under these relatively mild conditions violent thermal decompositions have been observed when untreated hydrazinium diperchlorate filter cake is thus purified by drying. Lower temperatures extend the drying process time even longer. In contrast using applicants pretreatment process, drying time on the same size batch is less than 1 hour and no thermal decomposition has been observed.

A significant additional advantage of this invention process is its applicability toward any hydrazinium diperchlorate cake derived from a neutralization process. Therefore the process lends itself to cakes derived from concentrated perchloric acid or aqueous solutions of it. Oddly enough when the mother liquor is 72 percent perchloric acid or higher the inventive treatment results in the propagation of an anhydrous material without the use of a thermal drying step.

The hydrogen fluoride used in the treatment of the hydrazinium diperchlorate in the inventive process should contain as little water as possible. The reason for this being that excess water dilutes the perchloric acid, increases solubilization of hydrazinium diperchlorate and generally negates the effect of the hydrogen fluoride. Preferably anhydrous hydrogen fluoride is utilized but concentrated hydrofluoric acid containing as much as about 10 percent by weight of water con be used successfully in most instances. An illustration of this can be seen by the embodiment below:

In this embodiment, a mixture of 7.0 g. hydrazinium diperchlorate filter cake (Analysis: 90.00 percent by weight hydrazinium diperchlorate, 5.00 percent perchloric acid, and, by difference, 5.0 percent by weight $H_2O$), and 10.500 g. of aqueous hydrogen fluoride (10 percent by weight $H_2O$—90 percent HF) is stirred for 1 hour at 0° C., and then filtered. This procedure is repeated two more times with additional quantities of anhydrous hydrogen fluoride (10.200 g./wash). After the third treatment the mixture is filtered, and then dried in vacuo for 30 minutes at room temperature. Analysis of the dried solid indicates the composition to be more than 96.00 percent hydrazinium diperchlorate, the residue being perchloric acid and water. This treatment results in the substantial removal of the perchloric acid and water in the original cake.

While the previous discussion and the enumerated embodiments do to some extent describe the scope of their invention, the metes and bounds are best shown by the claims which follow.

What is claimed is:

1. A process for concurrently decreasing the perchloric acid and water content of hydrazinium diperchlorate dihydrate contaminated with perchloric acid and water, comprising the steps of at least once:
   a. contacting the hydrazinium diperchlorate dihydrate with at least about an equal weight of concentrated hydrogen fluoride below about 19° C. until a slurry of solid anhydrous hydrazinium diperchlorate, hydrogen fluoride, perchloric acid and water is formed; and
   b. separating the solid anhydrous hydrazinium diperchlorate present in the slurry.

2. A process for concurrently decreasing the perchloric acid and water content of hydrazinium diperchlorate dihydrate contaminated with perchloric acid and water comprising the steps of:
   a. contacting the contaminated hydrazinium diperchlorate dihydrate with about 1.5 to 30 times its weight of anhydrous hydrogen fluoride and stirring between about −10° to 19° C. for at least about 10 minutes to form a slurry of solid anhydrous hydrazinium diperchlorate, hydrogen fluoride, perchloric acid and water;
   b. separating the solid anhydrous hydrazinium diperchlorate present in the slurry; and
   c. repeating the slurry and separating steps of (a) and (b) at least twice.

3. In a process for preparing hydrazinium diperchlorate by neutralizing a hydrazine reactant selected from the group consisting of hydrazine, hydrazine monohydrochloride and hydrazine diperchlorate, with a stoichiometric excess of concentrated perchloric (72 percent by weight) acid to form a mother liquor and hydrazinium diperchlorate, the improvement comprising removing said hydrazine diperchlorate formed and treating it at least once with at least 1:1 by weight ratio of anhydrous hydrogen fluoride to form a slurry including hydrogen diperchlorate, hydrogen fluoride and water, and separating said hydrazine diperchlorate from the water and perchloric acid.

* * * * *